US012181884B2

(12) United States Patent
Baik et al.

(10) Patent No.: US 12,181,884 B2
(45) Date of Patent: Dec. 31, 2024

(54) ROBOT AND METHOD FOR CONTROLLING THEREOF

(71) Applicant: SAMSUNG ELECTRONICS CO., LTD., Suwon-si (KR)

(72) Inventors: Aron Baik, Suwon-si (KR); Myounggon Kim, Seoul (KR); Eunsoll Chang, Suwon-si (KR); Mideum Choi, Suwon-si (KR); Heejun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 17/747,611

(22) Filed: May 18, 2022

(65) Prior Publication Data

US 2022/0308591 A1    Sep. 29, 2022

Related U.S. Application Data

(63) Continuation of application No. PCT/KR2021/016872, filed on Nov. 27, 2021.

(30) Foreign Application Priority Data

Mar. 23, 2021  (KR) .......................... 10-2021-0037260

(51) Int. Cl.
*G05D 1/00* (2024.01)
*G05D 1/622* (2024.01)

(52) U.S. Cl.
CPC ........... *G05D 1/0214* (2013.01); *G05D 1/622* (2024.01)

(58) Field of Classification Search
CPC .... G05D 1/0214; G05D 1/622; G05D 1/0248; G06V 20/52; B25J 9/1666; B25J 5/007; B25J 9/161; B25J 9/1694; B25J 13/08
See application file for complete search history.

(56) References Cited

U.S. PATENT DOCUMENTS 5,541,590 A    7/1996  Nishio
7,853,372 B2   12/2010  Park et al.
(Continued)

FOREIGN PATENT DOCUMENTS

JP    7-85280 B2     9/1995
JP    2020-184274 A  11/2020
(Continued)

OTHER PUBLICATIONS

Srivastava et al., "Unsupervised Learning of Video Representations using LSTMs," JMLR: W&CP vol. 37, Proceedings of the 32 nd International Conference on Machine Learning, Lille, France, 2015, Total 10 pages.
(Continued)

*Primary Examiner* — Ian Jen
*Assistant Examiner* — Karston G. Evans
(74) *Attorney, Agent, or Firm* — Sughrue Mion, PLLC

(57) ABSTRACT

A robot includes: a sensor; a driver; a memory storing instructions; and a processor, wherein the processor is configured to execute the instructions to: acquire first scan data including location information of an object around the robot based on a sensing value acquired by the sensor at a first time point, input the first scan data to a neural network model learned to predict scan data to acquire second scan data predicted to be acquired by the robot at a second time point after the first time point, identify a possibility of collision with the object based on location information of the object included in the second scan data; acquire driving data based on the identified possibility of collision; and control the driver based on the acquired driving data.

20 Claims, 14 Drawing Sheets

(56) References Cited

U.S. PATENT DOCUMENTS

| | | |
|---|---|---|
| 8,077,198 B2 | 12/2011 | Chen et al. |
| 8,767,186 B2 | 7/2014 | Lu et al. |
| 9,254,846 B2 | 2/2016 | Dolgov et al. |
| 9,383,753 B1 | 7/2016 | Templeton et al. |
| 10,949,885 B2 | 3/2021 | Xiao et al. |
| 11,561,102 B1* | 1/2023 | Ebrahimi Afrouzi ........................ G05D 1/0272 |
| 2013/0051624 A1* | 2/2013 | Iwasaki ................ G06V 10/255 382/103 |
| 2018/0253105 A1* | 9/2018 | Suzuki ................... G01C 21/20 |
| 2019/0047559 A1* | 2/2019 | Conde .................. B60W 50/14 |
| 2020/0010081 A1 | 1/2020 | Yoon |
| 2020/0086487 A1* | 3/2020 | Johnson ................ B25J 9/1697 |
| 2020/0290608 A1 | 9/2020 | Liu et al. |
| 2020/0317190 A1 | 10/2020 | Tong et al. |
| 2020/0369271 A1 | 11/2020 | Jang et al. |
| 2021/0075966 A1* | 3/2021 | Camyre .................. G01S 17/86 |
| 2021/0278850 A1* | 9/2021 | Moore .................... G05D 1/024 |
| 2021/0295171 A1* | 9/2021 | Kamenev .................. G06T 7/70 |
| 2022/0185324 A1* | 6/2022 | Lee ........................ G06V 20/58 |

FOREIGN PATENT DOCUMENTS

| | | |
|---|---|---|
| JP | 2021-508902 A | 3/2021 |
| KR | 10-2007-0115244 A | 12/2007 |
| KR | 10-2019-0106840 A | 9/2019 |
| KR | 10-2020-0023707 A | 3/2020 |
| KR | 10-2119641 B1 | 6/2020 |
| KR | 10-2020-0104258 A | 9/2020 |
| KR | 10-2316012 B1 | 10/2021 |

OTHER PUBLICATIONS

Mathieu et al., "Deep Multi-Scale Video Prediction Beyond Mean Square Error," Published as a conference paper at ICLR, 2016, Total 14 pages.

Long et al., "Deep-Learned Collision Avoidance Policy for Distributed Multi-Agent Navigation," IEEE Robotics and Automation Letters. Preprint Version. Accepted Dec. 2016, Total 8 pages.

Prabhakar et al., "Obstacle Detection and Classification using Deep Learning for Tracking in High-Speed Autonomous Driving," 2017 IEEE Region 10 Symposium (TENSYMP), 2017, Total 6 pages.

International Search Report and Written Opinion dated Mar. 2, 2022, issued by the International Searching Authority in International Application No. PCT/KR2021/016872 (PCT/ISA/210 and PCT/ISA/237).

* cited by examiner

ROBOT AND METHOD FOR CONTROLLING THEREOF

CROSS-REFERENCE TO RELATED APPLICATION(S)

This application is a bypass continuation of International Application No. PCT/KR2021/016872, filed on Nov. 17, 2021, which is based on and claims priority to Korean Patent Application No. 10-2021-0037260, filed on Mar. 23, 2021, in the Korean Patent Office, the disclosures of which are incorporated by reference herein in their entireties.

BACKGROUND

1. Field

The disclosure relates to a robot and a method for controlling thereof, and more particularly, to a robot for identifying a possibility of collision with an object based on scan data, and a method for controlling thereof.

2. Description of Related Art

For safe autonomous driving of a robot, it is necessary to predict a method of predicting collisions with surrounding obstacles in advance and controlling the robot's driving based on the predicted results. As shown in FIG. 1, a related art robot performs an operation of recognizing an object 1 included in photographed images 11, 12, and 13 acquired through a camera in order to predict a collision with an obstacle. In addition, the robot predicts a motion of the recognized object 1 by performing a tracking operation on the recognized object 1, and predicts a collision with the object 1 based on the predicted motion.

In order to use such a related art collision prediction method, an operation for recognizing the object 1 included in the photographed images 11, 12, and 13 and an operation for tracking the recognized object are essentially required. Particularly, when a plurality of objects are included in the photographed images 11, 12, and 13, the amount of computation is greatly increased because the related art robot needs to recognize and track each of the plurality of objects. Accordingly, a size of the collision prediction model increases, which is a factor that increases a manufacturing cost of the robot.

Accordingly, there is a need for a technology capable of identifying a possibility of collision with an object even with a relatively small amount of computation.

SUMMARY

Provided is a robot capable of identifying a possibility of collision with an object even with a small amount of computation compared to the related robot.

The technical problems of the disclosure are not limited to the technical problems described above, and the other technical problems not described will be clearly understood by those skilled in the art from the following description.

In accordance with an aspect of the disclosure, there is provided a robot including: a sensor; a driver; a memory storing instructions; and a processor, wherein the processor is configured to execute the instructions to: acquire first scan data including location information of an object around the robot based on a sensing value acquired by the sensor at a first time point, input the first scan data to a neural network model learned to predict scan data to acquire second scan data predicted to be acquired by the robot at a second time point after the first time point, identify a possibility of collision with the object based on location information of the object included in the second scan data; acquire driving data based on the identified possibility of collision; and control the driver based on the acquired driving data.

The first scan data and the second scan data may be vector type data including a plurality of angles with respect to a central point of the robot and distance information corresponding to each of the plurality of angles.

The sensor may include a depth sensor, and wherein the processor may be further configured to execute the instructions to: acquire a depth image of an area around the robot using the depth sensor, acquire three-dimensional (3D) point clouds based on camera calibration information with respect to the depth image, and identify points corresponding to a predetermined height among the point clouds to acquire the first scan data based on the identified points.

The processor may be further configured to execute the instructions to, based on a vector including a distance value smaller than a predetermined value being identified among a plurality of vectors included in the second scan data, identify that the possibility of collision with the object at a location corresponding to the identified vector at the second time point is higher than a predetermined possibility.

The processor may be further configured to acquire driving data for bypassing the location corresponding to the identified vector, and control the driver based on the acquired driving data.

The processor may be further configured to execute the instructions to: group vectors adjacent to each other among a plurality of vectors included in the first scan data in units of a predetermined number, obtain an average value of distance values included in each of the grouped vectors, replace the distance values included in each of the grouped vectors with the obtained average value to perform preprocessing on the first scan data, and input the preprocessed first scan data into the neural network model to acquire the second scan data.

The processor may be further configured to execute the instructions to input a plurality of first scan data into the neural network model to acquire the second scan data, and the plurality of first scan data may include first-first scan data corresponding to a first-first time point, first-second scan data corresponding to a first-second time point after the first-first time point, and first-third scan data corresponding to a first-third time point after the first-second time point.

The robot may further include a motion detection sensor, wherein the processor may be further configured to execute the instructions to: acquire angular velocity information of the robot based on a sensing value of the motion detection sensor, and input the first scan data and the acquired angular velocity information into the neural network model to acquire the second scan data.

In accordance with an aspect of the disclosure, there is provided a method for controlling a robot including a sensor and a driver, the method including: acquiring first scan data including location information of an object around the robot based on a sensing value acquired by the sensor at a first time point; inputting the first scan data to a neural network model learned to predict scan data to acquire second scan data predicted to be acquired by the robot at a second time point after the first time point; identifying a possibility of collision with the object based on location information of the object included in the second scan data; and acquiring driving data based on the identified possibility of collision to control the driver based on the acquired driving data.

The first scan data and the second scan data are vector type data including a plurality of angles with respect to a central point of the robot and distance information corresponding to each of the plurality of angles.

The acquiring the first scan data may include: acquiring a depth image of an area around the robot using a depth sensor; acquiring three-dimensional (3D) point clouds based on camera calibration information with respect to the depth image; and identifying points corresponding to a predetermined height among the point clouds to acquire the first scan data based on the identified points.

The identifying the possibility of collision with the object may include, based on a vector including a distance value smaller than a predetermined value being identified among a plurality of vectors included in the second scan data, identifying that the possibility of collision with the object at a location corresponding to the identified vector at the second time point is higher than a predetermined possibility.

The acquiring the driving data may include acquiring driving data for bypassing the location corresponding to the identified vector.

The method may further include performing preprocessing on the first scan data, the performing preprocessing may include: grouping vectors adjacent to each other among a plurality of vectors included in the first scan data in units of a predetermined number; obtaining an average value of distance values included in each of the grouped vectors; and replacing the distance values included in each of the grouped vectors with the obtained average value to perform preprocessing on the first scan data, and the acquiring the second scan data may include inputting the preprocessed first scan data into the neural network model to acquire the second scan data.

The acquiring the second scan data may include: inputting a plurality of first scan data into the neural network model to acquire the second scan data, and the plurality of first scan data may include first-first scan data corresponding to a first-first time point, first-second scan data corresponding to a first-second time point after the first-first time point, and first-third scan data corresponding to a first-third time point after the first-second time point.

According to various embodiments as described above, the robot may identify a possibility of collision with an object even with a small amount of computation compared to the existing robot. Accordingly, a manufacturing cost of the robot may be reduced.

In addition, effects acquirable or predicted by embodiments are to be disclosed directly or implicitly in the detailed description of the embodiments of the disclosure. For example, various effects predicted according to embodiments will be disclosed in the detailed description to be described below.

This further aspect of the disclosure, advantages, and salient features of the disclosure will become apparent to those skilled in the art from the following detailed description, which discloses various embodiments of the disclosure in conjunction with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in embodiments will be briefly explained, and example embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The embodiments may vary, and may be provided in different example embodiments. Various embodiments will be described with reference to accompanying drawings. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific embodiments, and not to limit the scope of the present disclosure.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The embodiments of the disclosure will be described in greater detail below in a manner that will be understood by one of ordinary skill in the art. However, embodiments may be realized in a variety of different configurations, and not limited to descriptions provided herein. Also, well-known functions or constructions are not described in detail since they would obscure the invention with unnecessary detail.

Figure 1:
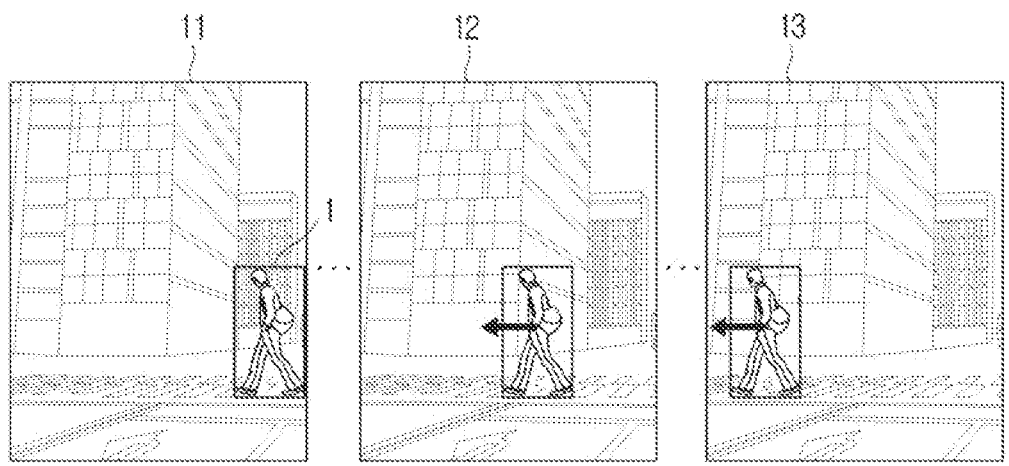
FIG. 1 is a view illustrating a related art collision prediction method.
Figure 2:
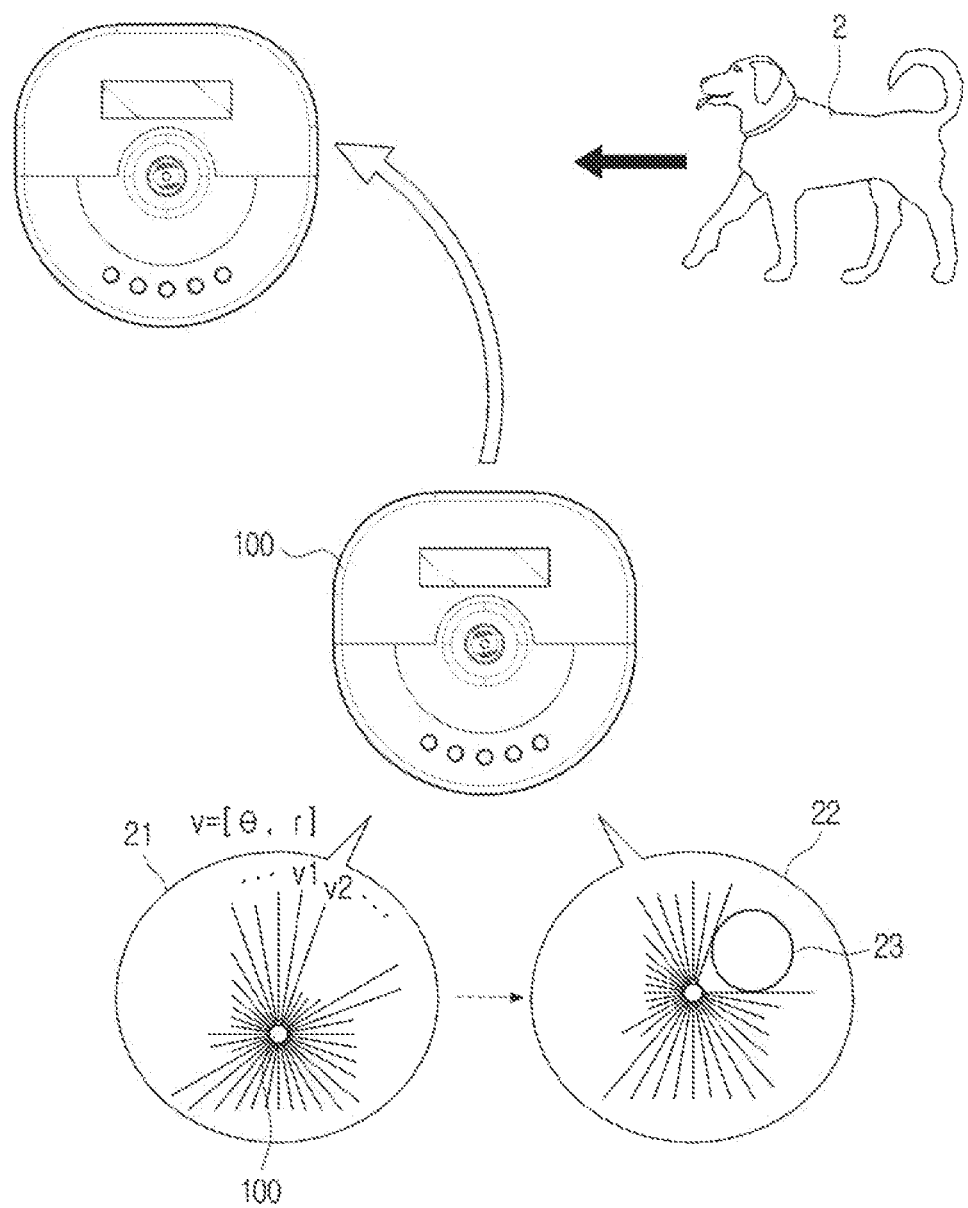
FIG. 2 is a view illustrating a robot according to an embodiment.

FIG. 2 is a view illustrating a robot according to an embodiment. A robot 100 may acquire scan data using a light detection and ranging (LiDAR) sensor. The scan data may be data in a form of vectors including an angle with respect to the robot 100 and a distance value corresponding to each angle. The scan data may include a plurality of vectors v1, v2 . . . vn including each angle θ and a distance r for each angle. The robot 100 may acquire first scan data 21 based on a sensing value acquired by the LiDAR sensor at a first time point. For example, the first scan data 21 may include a first vector v1 and a second vector v2.

The robot 100 may acquire second scan data 22 predicted to be acquired by the robot 100 at a second time point after the first time point based on the first scan data 21. For example, the robot 100 may acquire the second scan data 22 by inputting the first scan data 21 into a neural network model learned to predict scan data of a future time point.

The robot 100 may predict a collision with an object 2 based on the second scan data 22. For example, when a vector including a distance value smaller than a predetermined value among vectors included in the second scan data 22 is identified, the robot 100 may predict a collision with the object 2 will occur at a location 23 corresponding to the vector identified at the second time point. When the collision with the object 2 is predicted, the robot 100 may acquire driving data that bypasses the location 23 of the object 2 at the second time point. The robot 100 may drive based on the acquired driving data. Accordingly, the robot 100 may drive without colliding with the object 2.

In the related collision prediction method, in order to predict a collision between a robot and an object, an operation of recognizing an object and an operation of tracking the recognized object have to be performed. The collision prediction method according to embodiments may predict scan data of a future time point without performing the object recognition operation and the tracking operation, and may predict a collision between a robot and an object based on the predicted scan data. Accordingly, the collision prediction method according to embodiments requires smaller amount of computation than that of the related collision prediction method. For example, the robot 100 according to embodiments may predict a collision with an object even with a relatively small amount of computation compared to the related robot.

Figure 3:
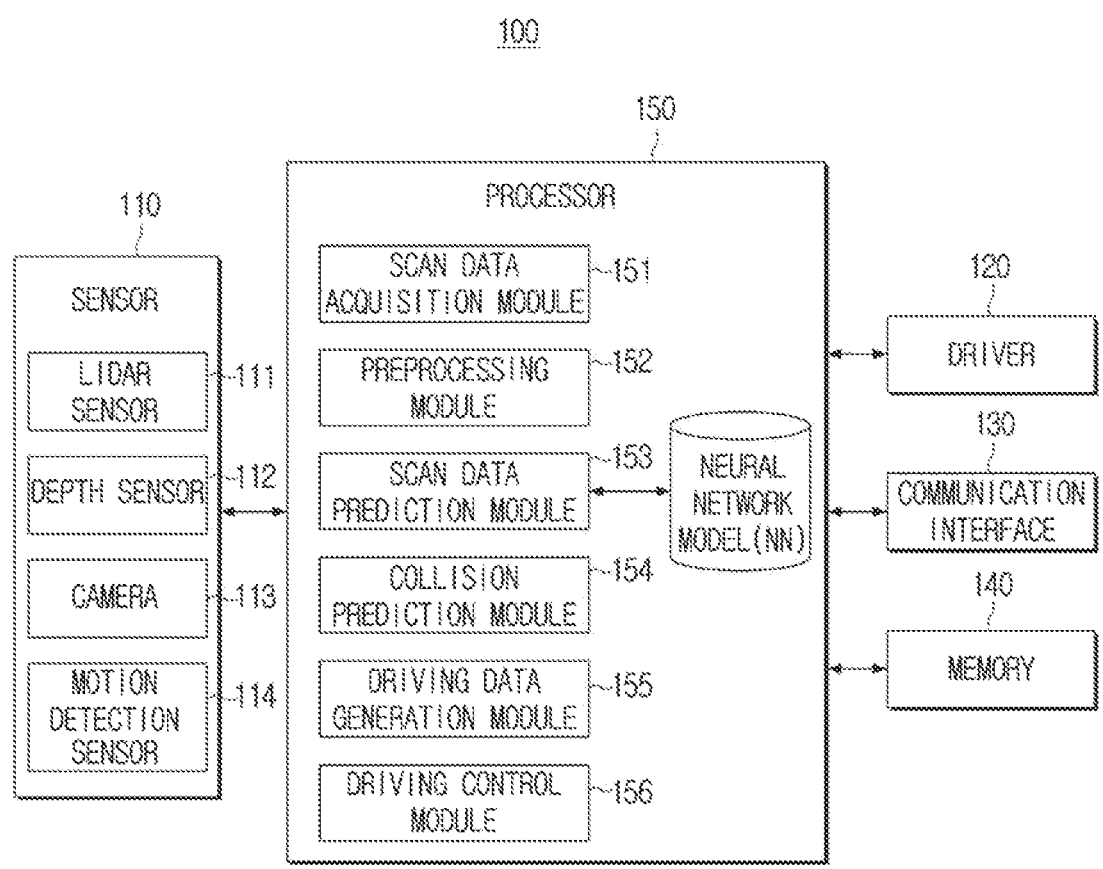
FIG. 3 is a block diagram illustrating a configuration of a robot according to an embodiment.

FIG. 3 is a block diagram illustrating a configuration of a robot according to an embodiment. The robot 100 may include a sensor 110, a driver 120, a communication interface 130, a memory 140, and a processor 150. For example, the robot 100 may be a cleaning robot, but is not limited thereto, and may be various robots such as, for example, a service robot, an industrial robot, and a military robot.

The sensor 110 is configured to collect information necessary for driving of the robot 100, and may include a LiDAR sensor 111, a depth sensor 112, a camera 113, and a motion detection sensor 114. However, embodiments are not limited thereto, and the sensor 110 may further include various sensors such as an ultrasonic sensor, or the like.

The LiDAR sensor 111 is configured to acquire scan data including location information on an object existing around the robot 100. For example, the processor 150 may acquire location information on an object around the robot 100 based on scan data acquired through the LiDAR sensor 111. Here, the location information on the object may include distance information and angle information between the robot 100 and the object. For example, the LiDAR sensor 111 may perform a scan at a predetermined angle (e.g., 360 degrees) with respect to the robot 100. For this operation, the LiDAR sensor 111 may output a laser beam in a form of a point source of light at a predetermined angle. According to another embodiment, the LiDAR sensor 111 may emit a laser beam in a form of a line beam.

The depth sensor 112 is configured to acquire a depth image including distance information. The processor 150 may acquire scan data based on the depth image acquired through the depth sensor 112. For example, the processor 150 may acquire a 3D point cloud using camera calibration information for a 2D depth image. In addition, the processor 150 may identify points corresponding to a predetermined height among the 3D point cloud, and convert the identified points into polar coordinates. Accordingly, the processor 150 may acquire scan data based on the depth image.

The camera 113 is configured to acquire an image photographed around the robot 100. The processor 150 may acquire scan data based on the red-green-blue (RGB) image acquired through the camera 113. For example, the processor 150 may identify a pixel having a size equal to or greater than a threshold value among pixels of the RGB image, and acquire scan data based on the identified pixel location and triangulation method.

The motion detection sensor 114 is a component configured to acquire motion information of the robot 100, and may include an acceleration sensor and a gyro sensor. However, embodiments are not limited thereto, and the motion detection sensor 114 may further include a speed sensor and a geomagnetic sensor. For example, the processor 150 may acquire acceleration information of the robot 100 based on a value sensed by the acceleration sensor. The processor 150 may also acquire information on rotation direction, rotation angle, and angular velocity of the robot 100 based on the sensed value of the gyro sensor.

The driver 120 may include a wheel configured to move the robot 100 and a wheel driving motor for rotating the wheel. In addition, the driver 120 may further include a motor driving circuit configured to supply a driving current to the wheel driving motor, a power transmission module configured to transmit a rotational force of the wheel driving motor to the wheel, and a rotation detection sensor configured to detect rotational displacement and rotational speed of the wheel.

The communication interface 130 may include at least one circuit and may communicate with various types of external devices according to various types of communication methods. The communication interface 130 may include at least one of a Wi-Fi module, a Bluetooth module, a ZigBee module, a Beacon module, a cellular communication module, a 3rd generation (3G) mobile communication module, and a 4th generation (4G) mobile communication module, a 4th generation long term evolution (LTE) communication module, and a 5th generation (5G) mobile communication module.

The memory 140 may store an operating system (OS) configured to control overall operations of components of the robot 100 and commands or data related to the components of the robot 100. For example, the memory 140 may store map information of indoors in which the robot 100 is located. The memory 140 may also store information on the depth sensor 112. For example, the information on the depth sensor 112 may include a focal length of the depth sensor 112, location information of the depth sensor 112, and posture information.

In addition, the memory 140 may store data necessary for a module configured to control the driving of the robot 100 to perform various operations. A module configured to control the driving of the robot 100 may include scan data acquisition module 151, a preprocessing module 152, scan data prediction module 153, a collision prediction module 154, a driving data generation module 155, and a driving control module 156. In addition, the memory 140 may store a neural network model NN learned to predict the scan data. The memory 140 may be implemented as a non-volatile memory (e.g., a hard disk, a solid state drive (SSD), a flash memory), a volatile memory, or the like.

The processor 150 may be electrically connected to the memory 140 to control overall functions and operations of the robot 100. When a user command for driving the robot 100 is input, the processor 150 may load data for modules 151 to 156 stored in the non-volatile memory to perform various operations into the volatile memory. In addition, the processor 150 may acquire the first scan data based on the sensing value of the sensor 110 and load the neural network model NN for acquiring the second scan data into the volatile memory. The processor 150 may perform various operations through various modules and the neural network model NN based on data loaded into the volatile memory. Here, the loading refers to an operation of loading and storing data stored in the non-volatile memory into the volatile memory such that it can be accessed by the processor 150.

The scan data acquisition module 151 may acquire scan data including location information on objects existing around the robot 100 at a certain distance and direction from the robot 100. The scan data, according to embodiments, may be vector-type data including an angle with respect to the robot 100 and a distance value corresponding to each angle. The scan data may include a plurality of vectors including each angle and a distance for each angle. In this case, an index may be assigned to each angle, and each of the plurality of vectors may be formed of a pair of an index and a distance value. For example, scan data may include a first vector consisting of a pair of a first index (e.g., 0) and a first distance corresponding to the first index with respect to a front (i.e., 0 degree) of the robot 100. When the front of the robot 100 is 0 degrees, the scan data may include a plurality of vectors for each of a plurality of angles within a predetermined angle range (e.g., 0 to 360 degrees) with respect to the robot 100. In addition, the scan data may be expressed in a form of polar coordinates or may be a photographed image acquired by photographing a specific area.

The scan data acquisition module 151 may acquire scan data in various ways. As an example, the scan data acquisition module 151 may acquire first scan data based on a sensing value of the LiDAR sensor 111. As another example, the scan data acquisition module 151 may acquire first scan data based on a depth image acquired through the depth sensor 112. In this case, the scan data acquisition module 151 may acquire a 3D point cloud using camera calibration information for the depth image. The camera calibration refers to predicting parameters such as focal length, main point, location and direction of a camera from a 2D photographed image. The scan data acquisition module 151 may identify points corresponding to a predetermined height (i.e., a z-axis value) in the 3D point cloud. The scan data acquisition module 151 may also acquire the first scan data based on the identified points. Here, the predetermined height may be determined based on an installation location (or height) of the LiDAR sensor 111.

The scan data acquisition module 151 may acquire the first scan data in real time and store it in the memory 140. According to embodiments, the first scan data refers to scan data acquired based on a sensing value acquired by the sensor 110 at a first time point. In addition, the second scan data, which will be described below, refers to scan data predicted to be acquired by the sensor 110 at a second time point after the first time point.

The preprocessing module 152 may perform pre-processing on the first scan data. The preprocessing module 152 may group adjacent vectors among a plurality of vectors included in the first scan data in a unit of a predetermined number (e.g., 2). In addition, the preprocessing module 152 may calculate an average value of distance values included in each of the grouped vectors. The preprocessing module 152 may replace the distance values of vectors included in each group with the calculated average value.

For example, the preprocessing module 152 may group a first vector including a first index (e.g., 1) and a second vector including a second index (e.g., 2) adjacent to the first index into a first group. In addition, the preprocessing module 152 may group a third vector including a third index (e.g., 3) and a fourth vector including a fourth index (e.g., 4) adjacent to the third index into a second group. In addition, the preprocessing module 152 may calculate a fifth distance value that is an average value of the first distance value included in the first vector and the second distance value included in the second vector. The preprocessing module 152 may replace each of the first distance value and the second distance value with a fifth distance value. Similarly, the preprocessing module 152 may calculate a sixth distance value that is an average value of the third distance value included in the third vector and the fourth distance value included in the fourth vector. In addition, the preprocessing module 152 may replace each of the third distance value and the fourth distance value with a sixth distance value.

When a specific vector included in the first scan data has a serious distance error, an accuracy of the second scan data output by the neural network model NN may decrease. In this case, when distance values of adjacent vectors are averaged, the distance error of the vectors may relatively decrease, and an accuracy of the second scan data may be improved. In the above description, as an example, a unit of the number in which adjacent vectors are grouped is 2, but this is only an example, and a plurality of vectors may be grouped in units of various numbers.

The scan data prediction module 153 may acquire scan data of a future time point, that is, scan data predicted to be acquired by the robot 100 at a future time point. For example, the scan data prediction module 153 may input the first scan data or the first scan data preprocessed by the preprocessing module 152 to the neural network model NN, such that the second scan data predicted to be acquired by the robot 100 at the future time point may be acquired. Here, the neural network model (NN) may be learned to predict scan data of a future time point and may include a convolutional neural network (CNN). The scan data prediction module 153 may acquire the second scan data in real time and store it in the memory 140.

The scan data prediction module 153 may acquire second scan data by inputting a plurality of first scan data to the neural network model NN. For example, the scan data prediction module 153 may input the plurality of first scan data acquired in the past rather than the current time to the neural network model NN. The plurality of first scan data may include 1-1 scan data corresponding to a 1-1 time point (or frame), 1-2 scan data corresponding to a 1-2 time point after the 1-1 time point, and 1-3 scan data corresponding to a 1-3 time point after the 1-2 time point.

It has been described in the above that the scan data prediction module 153 inputs the first scan data to the neural network model NN, but this is only an example, and the scan data prediction module 153 may obtain the second scan data by inputting motion information of the robot 100 obtained through the motion detection sensor 114 together with the first scan data to the neural network model NN. For example, the scan data prediction module 153 may input the first scan data and angular velocity information of the robot 100 to the neural network model NN. In this operation, time point information on the second scan data output by the neural network model NN may vary according to the input angular velocity information. For example, when an angular velocity of the robot 100 is 0 (e.g., when the robot 100 drives straight), the neural network model NN may output predicts the 2-1 scan data predicted to be acquired by the LiDAR sensor 111 one frame after a current frame. Also, when the angular velocity of the robot 100 is not 0 (e.g., when the robot 100 drives in a curve), the neural network model NN may output 2-2 scan data predicted to be acquired by the LiDAR sensor 111 5 frames after the current frame.

The learning data of the neural network model NN according to embodiments may include scan data for successive frames. The neural network model NN) may be learned to output scan data for a subsequent frame (i.e., n+N-th frame) for a predetermined time (e.g., N) based on based on the scan data corresponding to a specific frame (e.g., n-th frame).

The collision prediction module 154 may acquire a probability of collision between the robot 100 and the object based on location information of the object included in the second scan data. For example, the collision prediction module 154 may identify a vector including a distance value smaller than a predetermined value (e.g., 10 cm) among a plurality of vectors included in the second scan data. In this operation, the collision prediction module 154 may identify that the probability of collision between the robot 100 and the object at a location corresponding to the vector identified at the second time point at which the second scan data is predicted to be acquired, may be considered higher than a predetermined probability (e.g., 70%). The collision prediction module 154 may also acquire information on a location where a collision is predicted at the second time point based on the index of the identified vector. For example, when the index of the identified vector is 0, the collision prediction module 154 may predict that a collision between the robot 100 and the object will occur in front of the robot 100.

The collision prediction module 154 may acquire a collision probability based on motion information of the robot 100. As an example, the collision prediction module 154 may acquire a collision probability based on a driving speed (or linear speed information) of the robot 100. For example, when the robot 100 drives at a first speed, the collision prediction module 154 may acquire a collision probability based on second scan data after a first frame (e.g., third frame) based on a current frame of the LiDAR sensor 111 among a plurality of second scan data. When the robot 100 drives at a second speed greater than the first speed, the collision prediction module 154 may acquire a collision probability based on the second scan data after a second frame (e.g., fifth frame) greater than the first frame based on the current frame of the LiDAR sensor 111. For example, the collision prediction module 154 may identify one second scan data among the plurality of second scan data based on motion information of the robot 100, and acquire a collision probability based on the identified second scan data.

According to embodiments, the collision prediction module 154 acquires a collision probability based on the second scan data output by the neural network model (NN), but embodiments are not limited thereto, and the neural network model NN may output collision prediction information or collision probability. In addition, the neural network model NN may be implemented to output information on the time and location at which the collision is predicted to occur. In this case, the collision prediction module 154 may identify the output data of the neural network model NN to identify the collision possibility.

The driving data generation module 155 may generate driving data based on the acquired collision probability. For example, the driving data generation module 155 may generate a driving route through which the robot 100 may bypass or avoid an object. For example, when the robot 100 is driving to a specific destination, the driving data generation module 155 may generate a driving route capable of reaching a destination by bypassing the object. According to another embodiment, when the robot 100 is a cleaning robot that performs a cleaning operation indoors, the driving data generation module 155 may generate a driving route capable of performing the cleaning operation while avoiding the object.

The driving data generation module 155 may determine a safety distance with the object based on the collision probability, and generate driving data based on the determined safety distance. For example, when a collision probability is 90%, the driving data generation module 155 may generate driving data based on a first safety distance. When the collision probability is 60%, the driving data generation module 155 may generate driving data based on a second safety distance smaller than the first safety distance.

The driving control module 156 may control the driver 120 based on driving data generated by the driving data generation module 155. For example, the driving control module 156 may control a speed of the wheel driving motor or rotate the wheel based on the generated driving data.

In FIG. 3, each of the modules 151 to 154 is illustrated as a configuration of the processor 150, but embodiments are not limited thereto, and each of the modules 151 to 154 may be stored in the memory 140. In this case, the processor 150 may load the plurality of modules 151 to 154 stored in the memory 140 from the non-volatile memory to the volatile memory to execute respective functions of the plurality of modules 151 to 154. In addition, each module of the processor 150 may be implemented as software or a combination of software and hardware.

Functions related to artificial intelligence according to embodiments may be operated through the processor 150 and the memory 140. The processor 150 may include one or a plurality of processors. In this case, one or more processors may be a general-purpose processor such as a CPU, an AP, a digital signal processor (DSP), or the like, a graphics-only processor such as a GPU, a vision processing unit (VPU), or an artificial intelligence-only processor such as an NPU. One or a plurality of processors may control to process input data according to a predefined operation rule or artificial intelligence model stored in the memory 140. According to another embodiment, when one or more processors are artificial intelligence (AI)-only processors, the AI-only processor may be designed with a hardware structure specialized for processing a specific AI model.

The predefined operation rule or artificial intelligence model is characterized in that it is generated through learning. Here, being generated through learning means that a basic artificial intelligence model is learned using a plurality of learning data by a learning algorithm, such that a predefined operation rule or artificial intelligence model set to perform a desired characteristic (or purpose) is generated. Such learning may be performed in a device itself on which artificial intelligence according to embodiments performed, or may be performed through a separate server and/or system. Examples of the learning algorithm include supervised learning, unsupervised learning, semi-supervised learning, or reinforcement learning, but are not limited thereto.

The artificial intelligence model may be generated through learning. Here, being generated through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weights. The plurality of weights of the plurality of neural network layers may be optimized by a learning result of the artificial intelligence model. For example, a plurality of weights may be updated such that a loss value or a cost value acquired from the artificial intelligence model during the learning process is reduced or minimized.

The artificial intelligence model may be processed by an AI-only processor designed with a hardware structure specialized for processing the artificial intelligence model. The artificial intelligence model may be generated through learning. Here, being generated through learning means that a basic artificial intelligence model is learned using a plurality of learning data by a learning algorithm, such that a predefined operation rule or artificial intelligence model set to perform a desired characteristic (or purpose) is generated. The artificial intelligence model may be composed of a plurality of neural network layers. Each of the plurality of neural network layers has a plurality of weight values, and perform a neural network operation through an operation between an operation result of a previous layer and a plurality of weights.

Artificial neural networks may include deep neural network (DNN) such as convolutional neural network (CNN), deep neural network (DNN), recurrent neural network (RNN), generative adversarial network (GAN), restricted Boltzmann machine (RBM), deep belief network (DBN), bidirectional recurrent deep neural network (BRDNN), or deep Q-networks, but is not limited to the example described above.

Figure 4A:
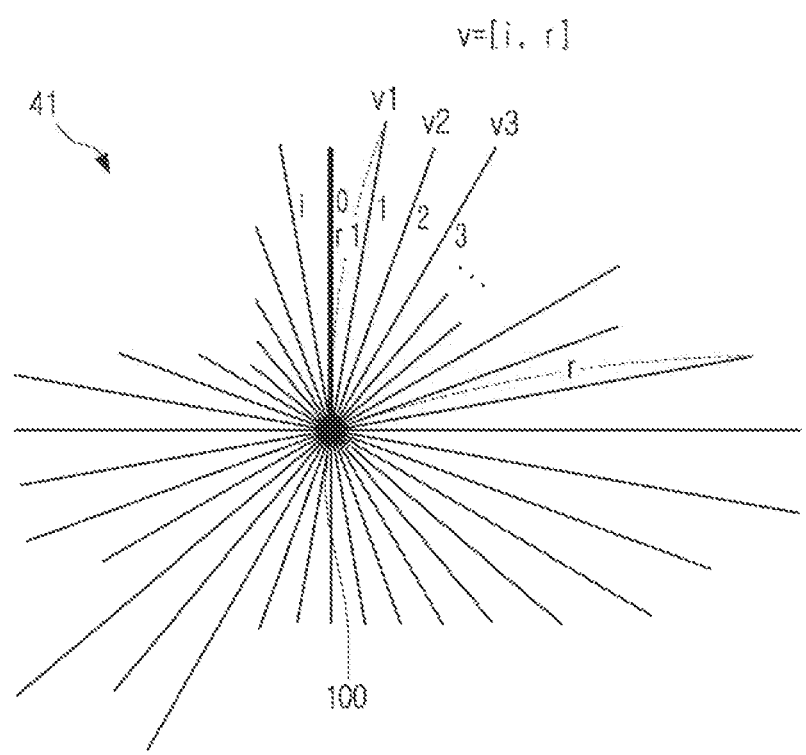
FIG. 4A is a view illustrating scan data according to an embodiment.
Figure 4B:
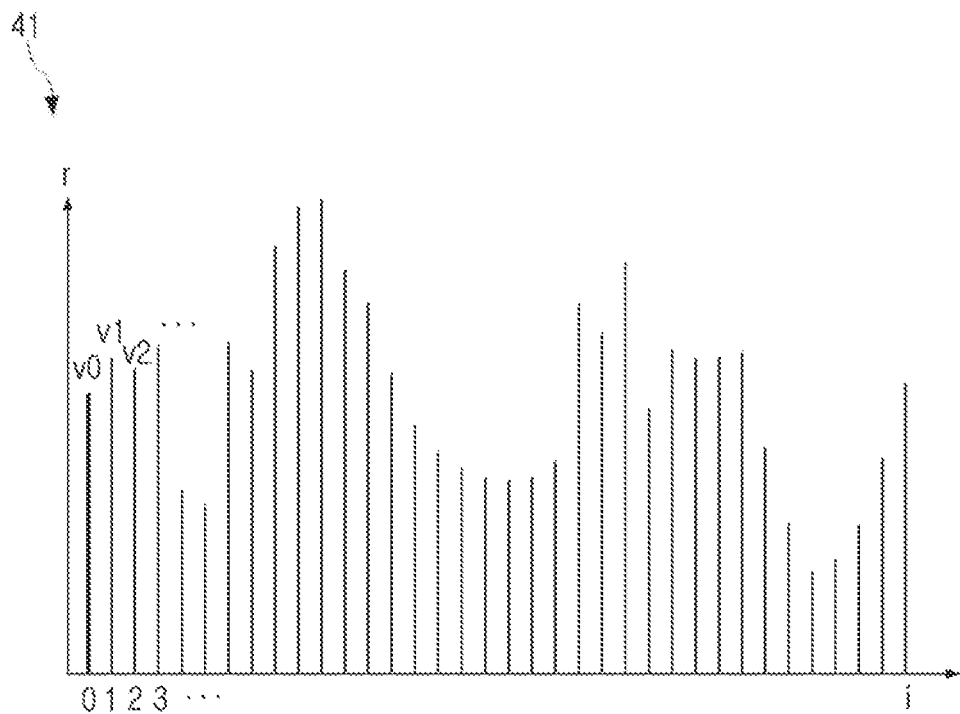
FIG. 4B is a view illustrating scan data according to another embodiment.

FIGS. 4A and 4B are views illustrating scan data according to an embodiment. Referring to FIG. 4A, scan data 41 may include vectors v1, v2, v3, which include distance information for each angle with respect to the robot 100. Each of the vectors v1, v2, v3 ... vn may include an index i and a distance value r corresponding to an angle. For example, the first vector v1 may include a first index (i.e., 1) and a first distance value r1. The scan data 41 may be represented as a graph as shown in FIG. 4B. In this case, x-axis is an index i, and y-axis is a distance r between the robot 100 and the object.

The robot 100 may acquire the first scan data using various ways. As an example, the robot 100 may acquire first scan data based on a sensing value of the LiDAR sensor 111.

Figure 5:
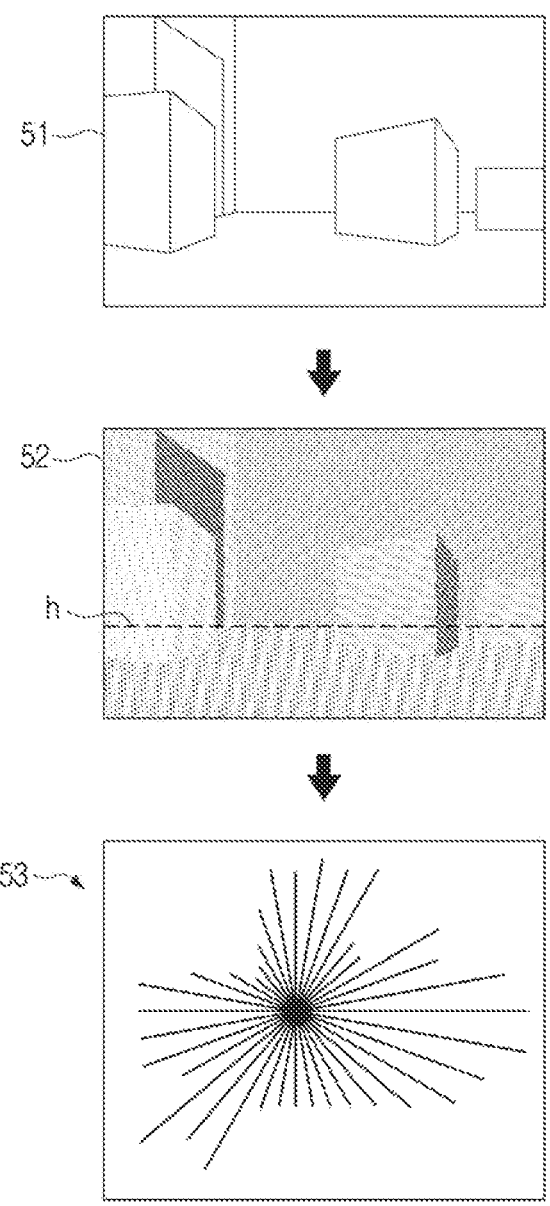
FIG. 5 is a view illustrating a method of acquiring first scan data according to an embodiment.

As another example, the robot 100 may acquire the first scan data using the depth sensor 112. FIG. 5 is a view illustrating a method of acquiring first scan data according to an embodiment. Referring to FIG. 5, the robot 100 may acquire a depth image 51 based on a value sensed by the depth sensor 112. The robot 100 may acquire a 3D point cloud 52 in a form of (x, y, z) based on each pixel value of the depth image 51. For example, the robot 100 may acquire the 3D point cloud 52 by using camera calibration information for the depth image 51. In addition, the robot 100 may acquire the first scan data 53 from the 3D point cloud 52. For example, the robot 100 may acquire points corresponding to a predetermined height h. Here, the predetermined height h may be determined based on an installation location of the LiDAR sensor 111. The robot 100 may acquire the first scan data 53 based on the acquired points.

Figure 6:
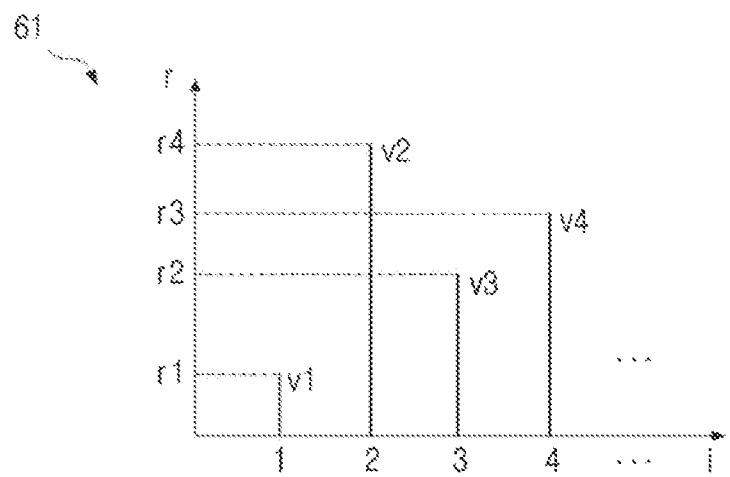
FIG. 6 is a view illustrating a pre-processing method for first scan data according to an embodiment.
Figure 6:
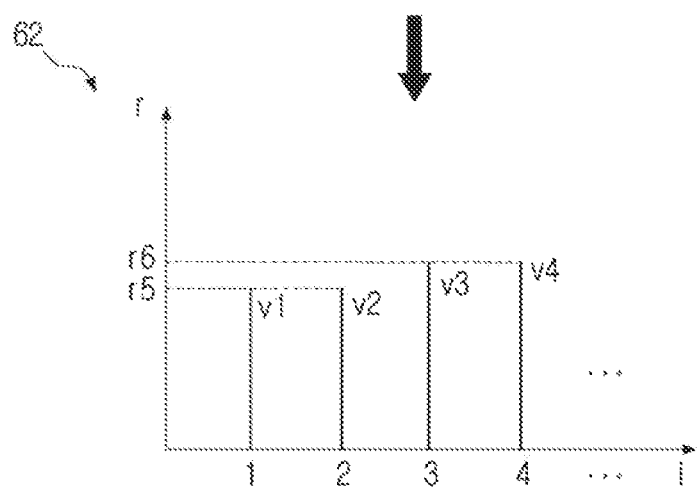

FIG. 6 is a view illustrating a pre-processing method for first scan data according to an embodiment. The robot 100 may acquire first scan data 61. For example, the first scan data 61 may include a first vector v1 including a first index (i.e., 1) and a first distance value r1. The first scan data 61 may include a second vector v2 including a second index (i.e., 2) and a second distance value r2. The first scan data 61 may include a third vector v3 including a third index (i.e., 3) and a third distance value r3. The first scan data 61 may include a fourth vector v4 including a fourth index (i.e., 4) and a fourth distance value r4.

The robot 100 may group vectors adjacent to each other among a plurality of vectors included in the first scan data in units of a predetermined number. For example, the robot 100 may group the first vector v1 and the second vector v2 into a first group. The robot 100 may also group the third vector v3 and the fourth vector v4 into a second group. The robot 100 may calculate an average value of distance values included in each of the grouped vectors, and replace the distance values of the vectors included in each group with the calculated average value. For example, the robot 100 may acquire a fifth distance value v5 that is an average value of the first distance value r1 included in the first vector v1 and the second distance value r2 included in the second vector v2. In addition, the robot 100 may change the first distance value r1 and the second distance value r2 into a fifth distance value r5. Similarly, the robot 100 may acquire a sixth distance value v6 that is an average value of the third distance value r3 included in the third vector v3 and the fourth distance value r4 included in the fourth vector v4. In addition, the robot 100 may change the third distance value r3 and the fourth distance value r4 into a sixth distance value r6. Accordingly, the robot 100 may acquire a preprocessed first scan data 62.

According to embodiments, as an example, a plurality of vectors included in the first scan data 61 are grouped by two, but embodiments are not limited thereto, and the plurality of vectors may be grouped in units of various numbers. For example, the plurality of vectors may be grouped by five.

Figure 7A:
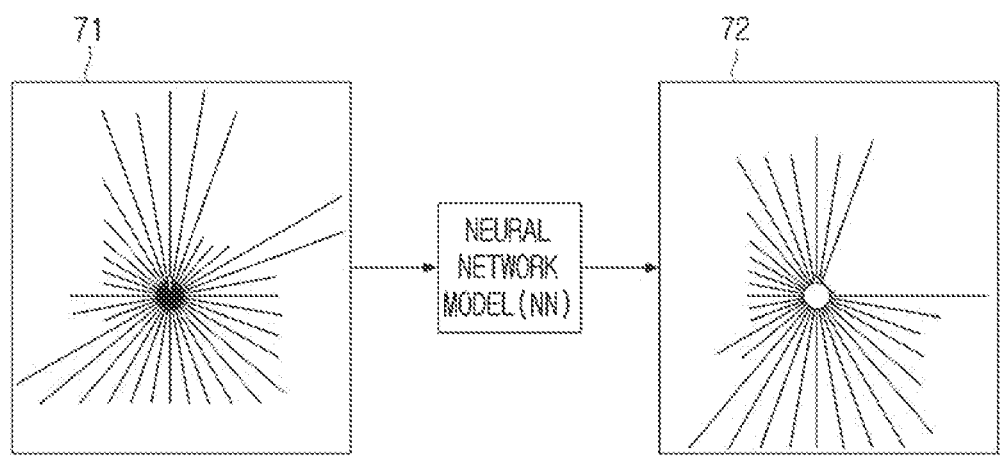
FIG. 7A is a view illustrating a method of acquiring second scan data according to an embodiment.

FIG. 7A is a view illustrating a method of acquiring second scan data according to an embodiment. Referring to FIG. 7A, the robot 100 may acquire second scan data 72 by inputting first scan data 71 into a neural network model NN. Here, the neural network model (NN) may be learned to predict scan data of a future time point and may include a convolutional neural network (CNN) and a recurrent neural network (RNN). The neural network model NN may be learned to output second scan data 72 corresponding to a second time point after a first time point based on the first scan data 71 corresponding to the first time point. Learning data of the neural network model NN may include scan data for a plurality of time points included in various scenarios. In addition, the scan data included in the learning data may be used for learning the neural network model NN after preprocessing as described with reference to FIG. 6 is performed.

Figure 7B:
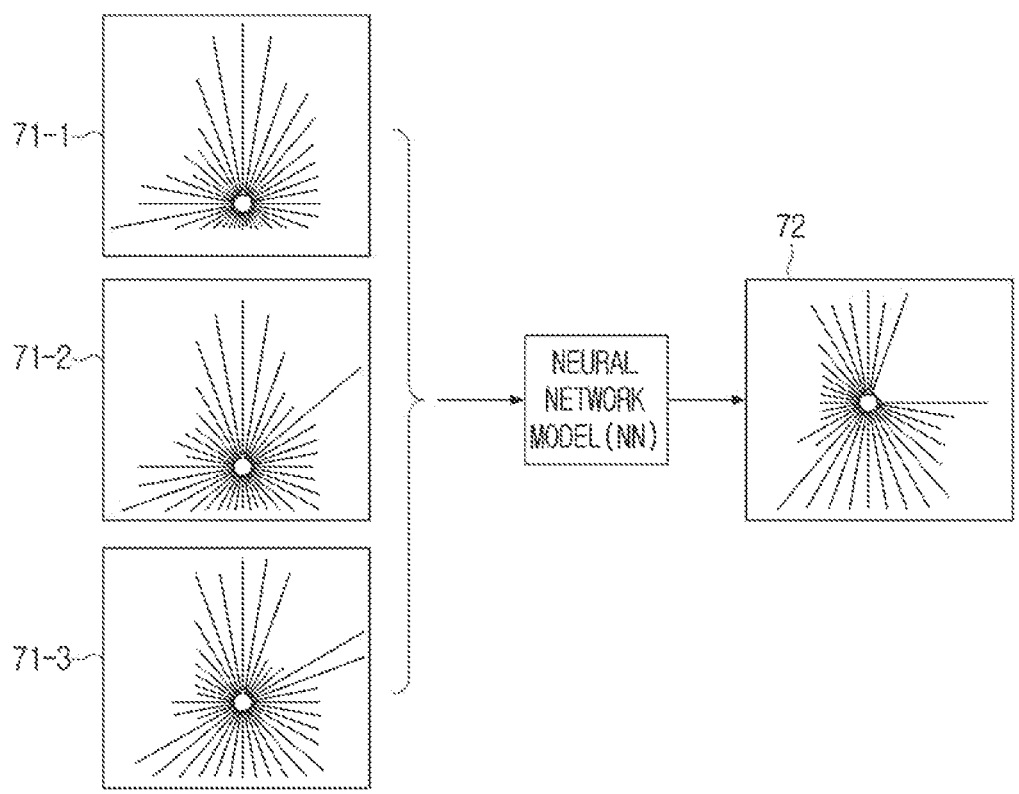
FIG. 7B is a view illustrating a method of acquiring second scan data according to another embodiment.

FIG. 7B is a view illustrating a method of acquiring second scan data according to another embodiment. The robot 100 may acquire the second scan data 72 by inputting a plurality of first scan data 71-1, 71-2, and 71-3 to the neural network model NN. For example, the robot 100 may input 1-1 scan data corresponding to a 1-1 time point, 1-2 scan data corresponding to a 1-2 time point after the 1-1 time point, and 1-3 scan data corresponding to a 1-3 time point after the 1-2 time point into the neural network model NN in order to acquire the second scan data 72.

Figure 7C:
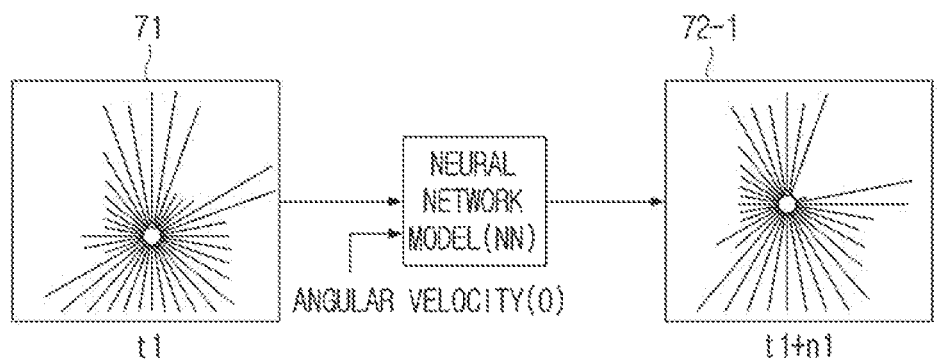
FIG. 7C is a view illustrating a method of acquiring second scan data according to another embodiment.
Figure 7C:
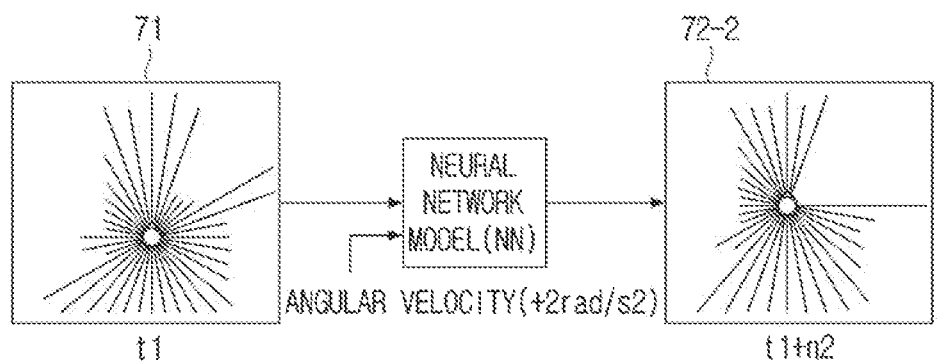

FIG. 7C is a view illustrating a method of acquiring second scan data according to another embodiment. The robot 100 may acquire second scan data 72-1 and 72-2 by inputting the first scan data 71 and angular velocity information of the robot 100 to the neural network model NN. In this case, a time point corresponding to the second scan data output by the neural network model NN may vary according to the input angular velocity information. For example, when the angular velocity of the robot 100 is 0 (that is, when the robot 100 drives straight), the neural network model NN may output a 2-1 scan data 72-1 predicted to be acquired by the robot 100 after a first time (n1) from a first time point(t1) corresponding to the first scan data 71. When the angular velocity of the robot 100 is 2 rad/s2 (that is, when the robot 100 drives through a curve in a clockwise direction), the neural network model NN may output a 2-2 scan data 72-2 predicted to be acquired by the robot 100 after a second time (n2) larger than the first time (n1) from the first time point. In other words, when the robot 100 drives through a curve, the neural network model NN may output second scan data corresponding to a more distant future time point.

In FIGS. 7A to 7C, the neural network model NN outputs second scan data corresponding to a future time point. However, embodiments are not limited thereto, and the neural network model NN may be learned to output information on a location at which a collision with an object is expected, information on an expected collision time, and a collision probability. In this case, the neural network model (NN) may output collision location information, information on a location where a collision is expected, information on a collision expected time, and a collision probability based on motion information of the robot 100 and the first scan data.

Figure 8:
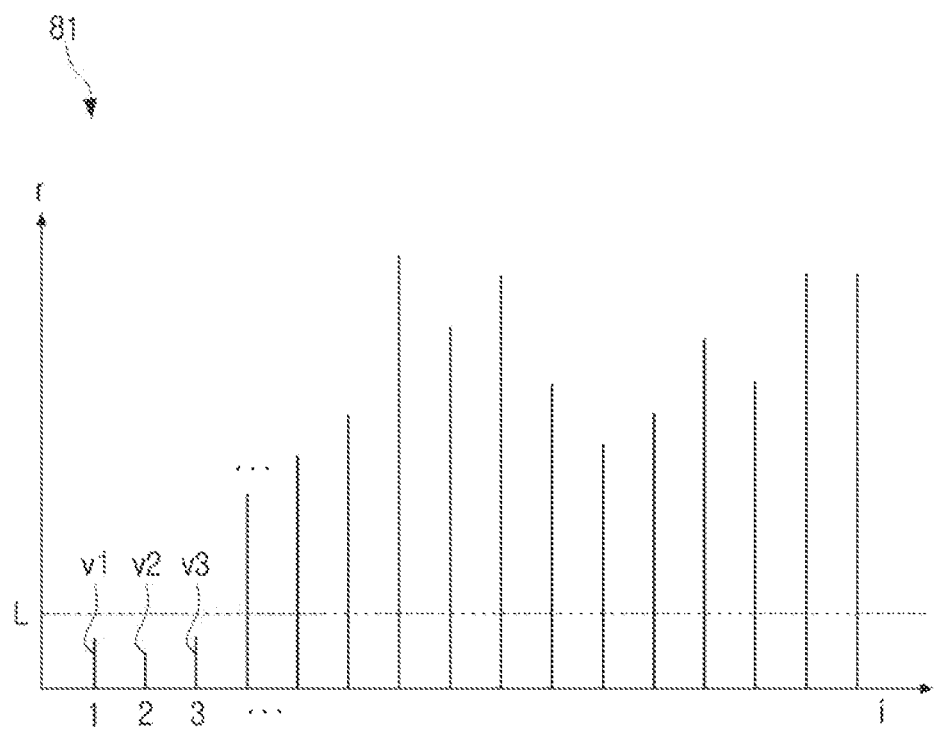
FIG. 8 is a graph illustrating second scan data according to an embodiment.

FIG. 8 is a view illustrating second scan data according to an embodiment. As described above, the scan data according to embodiments may be represented as a graph. In FIG. 8, x-axis is an index i corresponding to an angle between the robot 100 and an object, and y-axis is a distance r between the robot 100 and the object. The robot 100 may predict a collision with an object based on the second scan data 81. For example, the robot 100 may identify a first vector v1, a second vector v2, a third vector v3 including a distance value smaller than a predetermined value L among a plurality of vectors v1, v2, v3 . . . vn included in the second scan data 81. In this case, the robot 100 may predict a collision with the object at locations corresponding to the first vector v1, the second vector v2, and the third vector v3. For example, at the second time point corresponding to the second scan data 81, the robot 100 may identify that a possibility of collision with an object at locations corresponding to the first vector v1, the second vector v2, and the third vector v3 is higher than a predetermined probability.

The robot 100 may acquire second scan data in real time, and may identify second scan data corresponding to a specific time point to be used for collision prediction among the acquired second scan data. For example, the robot 100 may identify second scan data based on motion information of the robot 100 and predict a collision with an object based on the identified second scan data. In this case, a time point corresponding to the second scan data may be changed according to motion information of the robot 100.

Figure 9A:
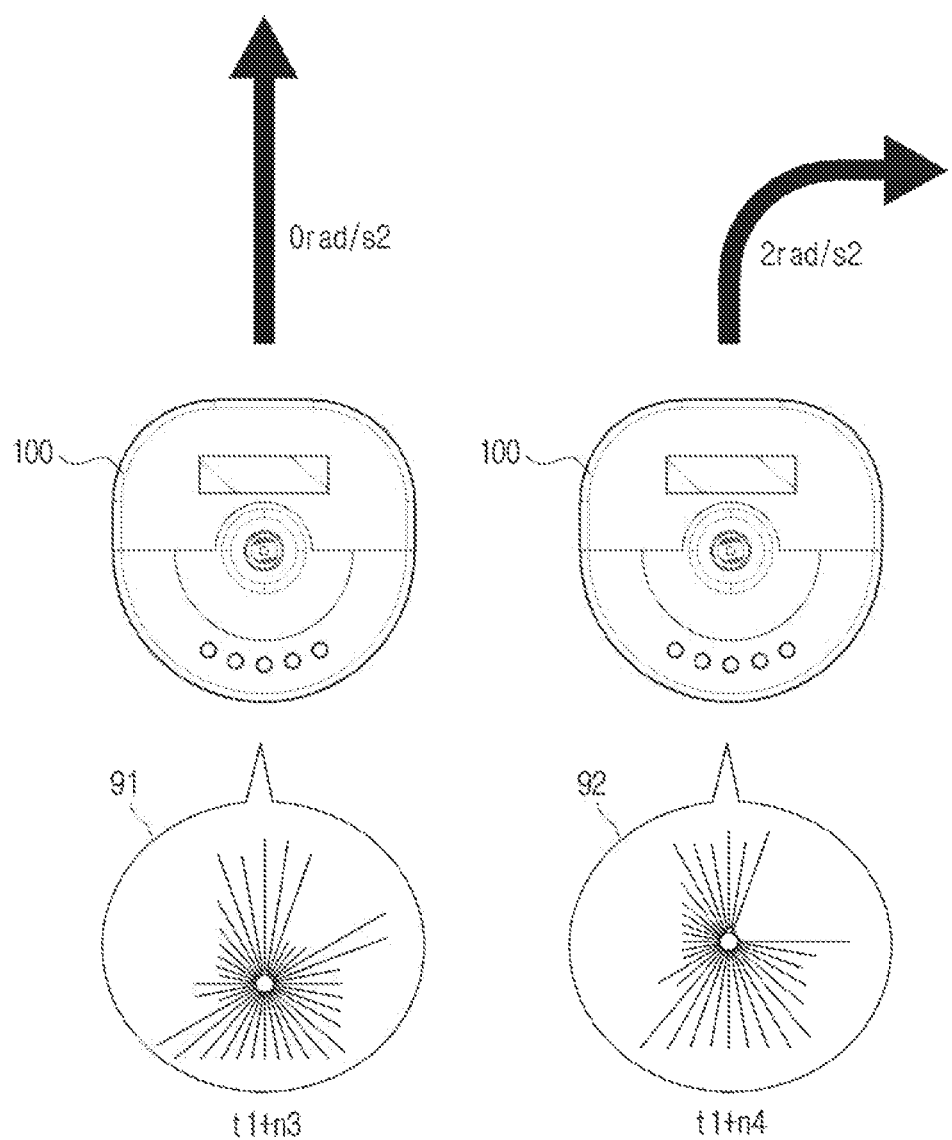
FIG. 9A is a view illustrating a collision prediction method according to an embodiment.

FIG. 9A is a view illustrating a collision prediction method according to an embodiment. The robot 100 may identify the second scan data based on angular velocity information of the robot 100. For example, when the angular velocity of the robot 100 is 0 (rad/s2), the robot 100 may identify a 2-1 scan data 91 predicted to be acquired by the robot 100 at 2-1 time point (t1+n3) after a third time (n3) from a first time point(t1) corresponding to the first scan data. In this case, the robot 100 may identify a possibility that the robot 100 collides with the object at the 2-1 time point (t1+n3) based on the 2-1 scan data 91. As another example, when the angular velocity of the robot 100 is 2 (rad/s2), the robot 100 may identify a 2-2 scan data 92 predicted to be acquired by the robot 100 at a 2-2 time point (t1+n4) after a fourth time (n4) from the first time point t1. In this case, the robot 100 may identify a possibility that the robot 100 collides with the object at the 2-2 time point (t1+n4) based on the 2-2 scan data 92. As such, the robot 100 may predict a collision with an object based on the second scan data for a more distant future time point in a rotating situation.

Figure 9B:
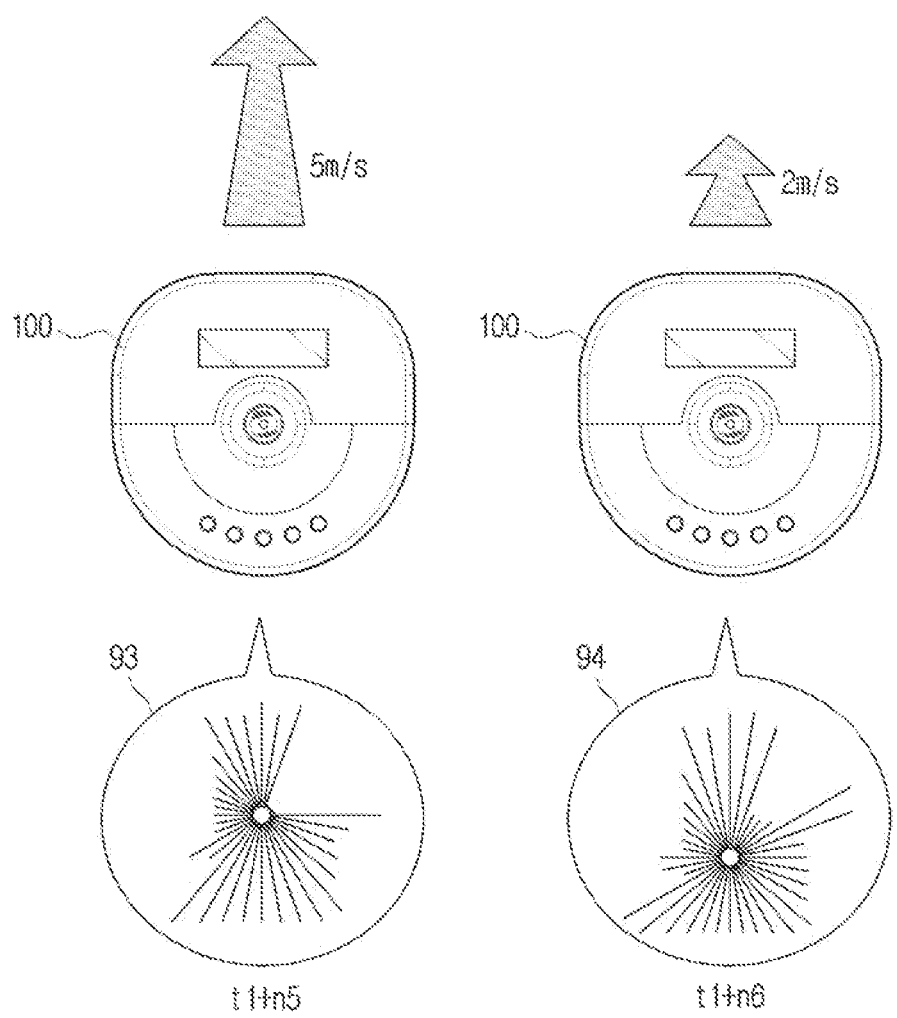
FIG. 9B is a view illustrating a collision prediction method according to another embodiment.

FIG. 9B is a view illustrating a collision prediction method according to another embodiment. The robot 100 may identify the second scan data based on a driving speed of the robot 100. For example, when the driving speed of the robot 100 is 5 (m/s), the robot 100 may identify a 2-3 scan data 93 predicted to be acquired by the robot 100 at a 2-3 time point 2 (t1+n5) after a fifth time (n5) from a first time point (t1) corresponding to the first scan data. In this case, the robot 100 may identify a possibility that the robot 100 collides with an object at the 2-3 time point (t1+n5) based on the 2-3 scan data 93. As another example, when the driving speed of the robot 100 is 2 (rad/s2), the robot 100 may identify a 2-4 scan data 94 predicted to be acquired by the robot 10 at a 2-4 time point (t1+n6) after a sixth time (n6) from the first time point (61). In this case, the robot 100 may identify a possibility that the robot 100 collides with the object at the 2-4 time point (t1+n6) based on the 2-4 scan data 94. As such, as a driving speed increases, the robot 100 may predict a collision with an object based on second scan data for a distant future time point.

Figure 10:
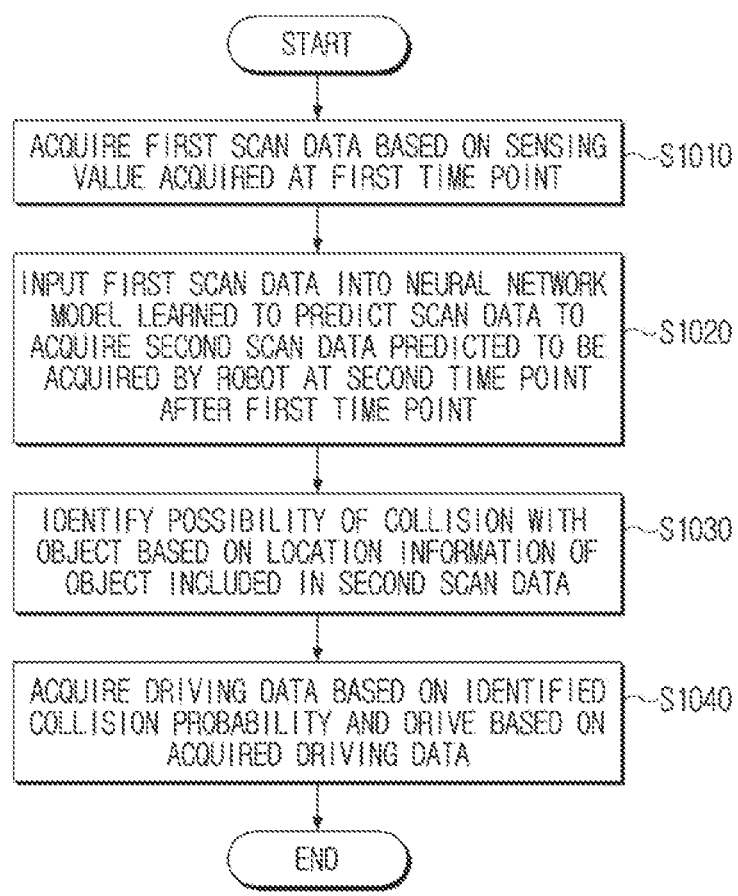
FIG. 10 is a flowchart illustrating a method for controlling a robot according to an embodiment.

FIG. 10 is a flowchart illustrating a method for controlling a robot according to an embodiment. The robot 100 may acquire first scan data based on a sensing value acquired at a first time point (S1010). In this case, the robot 100 may acquire first scan data based on a sensing value of a LiDAR sensor. According to another embodiment, the robot 100 may acquire the first scan data based on a depth image acquired by the depth sensor. For example, the robot 100 may acquire a 3D point cloud by using camera calibration information for the depth image. The robot 100 may also identify points corresponding to a predetermined height among point clouds, and acquire first scan data based on the identified points.

The robot 100 may acquire second scan data predicted to be acquired by the robot at a second time point after the first time point by inputting the first scan data to a neural network model learned to predict scan data (S1020). As an example, the robot 100 may acquire second scan data by inputting first scan data corresponding to first time point into the neural network model. As another example, the robot 100 may acquire second scan data by inputting a plurality of first scan data corresponding to a plurality of time points, respectively. In this case, the plurality of first scan data may include 1-1 scan data corresponding to a 1-1 time point, 1-2 scan data corresponding to a 1-2 time point after the 1-1 time point, and 1-3 scan data corresponding to a 1-3 time point after the 1-2 time point. The robot 100 may acquire the second scan data by inputting the first scan data and angular velocity information of the robot 100 to the neural network model.

The robot 100 may identify a possibility of collision with the object based on location information of the object included in the second scan data (S1030). For example, when a vector including a distance value smaller than a predetermined value among a plurality of vectors included in the second scan data is identified, the robot 100 may identify that the probability of collision with the object at the location corresponding to the vector identified at the second time point is higher than a predetermined possibility.

The robot 100 may acquire driving data based on the identified collision probability and drive based on the acquired driving data (S1040). For example, the robot 100 may acquire driving data for driving by bypassing the location corresponding to the vector identified at the second time point corresponding to the second scan data. In addition, the robot 100 may drive while avoiding a location where a collision is expected based on the acquired driving data.

Various embodiments described above may be embodied in a recording medium that may be read by a computer or a similar apparatus to the computer by using software, hardware, or a combination thereof. In some cases, embodiments described herein may be implemented by the processor itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. When the computer instructions stored in such a non-transitory computer-readable medium are executed by a processor, a specific apparatus may perform a processing operation according to various embodiments described above.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A robot comprising:
    a sensor;
    a driver;
    a memory storing instructions; and
    a processor,
    wherein the processor is configured to execute the instructions to:
        acquire first scan data including location information of an object around the robot based on a sensing value acquired by the sensor at a first time point,
        input the first scan data to a neural network model learned to predict scan data to acquire second scan data predicted to be acquired by the robot at a second time point after the first time point,
        identify a possibility of collision with the object based on location information of the object included in the second scan data;
        acquire driving data based on the identified possibility of collision; and
        control the driver based on the acquired driving data, and
    wherein the processor is further configured to execute the instructions to:
        group vectors adjacent to each other among a plurality of vectors included in the first scan data in units of a predetermined number,
        obtain an average value of distance values included in each of the grouped vectors,
        replace the distance values included in each of the grouped vectors with the obtained average value to perform preprocessing on the first scan data.

2. The robot of claim 1, wherein the first scan data and the second scan data are vector type data including a plurality of angles with respect to a central point of the robot and distance information corresponding to each of the plurality of angles.

3. The robot of claim 1, wherein the sensor comprises a depth sensor, and
    wherein the processor is further configured to execute the instructions to:
        acquire a depth image of an area around the robot using the depth sensor,
        acquire three-dimensional (3D) point clouds based on camera calibration information with respect to the depth image, and identify points corresponding to a predetermined height among the point clouds to acquire the first scan data based on the identified points.

4. The robot of claim 1, wherein the processor is further configured to execute the instructions to, based on a vector including a distance value smaller than a predetermined value being identified among a plurality of vectors included in the second scan data, identify that the possibility of collision with the object at a location corresponding to the identified vector at the second time point is higher than a predetermined possibility.

5. The robot of claim 4, wherein the processor is further configured to acquire driving data for bypassing the location corresponding to the identified vector, and control the driver based on the acquired driving data.

6. The robot of claim 1, wherein the processor is further configured to execute the instructions to:
    input the preprocessed first scan data into the neural network model to acquire the second scan data.

7. The robot of claim 1, wherein the processor is further configured to execute the instructions to input a plurality of first scan data into the neural network model to acquire the second scan data, and
wherein the plurality of first scan data include first-first scan data corresponding to a first-first time point, first-second scan data corresponding to a first-second time point after the first-first time point, and first-third scan data corresponding to a first-third time point after the first-second time point.

8. The robot of claim 1, further comprising:
a motion detection sensor,
wherein the processor is further configured to execute the instructions to:
acquire angular velocity information of the robot based on a sensing value of the motion detection sensor, and
input the first scan data and the acquired angular velocity information into the neural network model to acquire the second scan data.

9. The robot of claim 1, wherein the neural network model comprises one of a convolutional neural network (CNN) and a recurrent neural network (RNN).

10. The robot of claim 1, wherein the sensor comprises at least one of a light detection and ranging (LiDAR) sensor, a depth sensor, a camera, and a motion detection sensor.

11. The robot of claim 1, wherein the driver comprises:
wheels configured to move the robot; and
a motor configured to rotate the wheels.

12. The robot of claim 1, wherein the processor is further configured to acquire the second scan data based on a driving speed of the robot.

13. A method for controlling a robot comprising a sensor and a driver, the method comprising:
acquiring first scan data including location information of an object around the robot based on a sensing value acquired by the sensor at a first time point;
inputting the first scan data to a neural network model learned to predict scan data to acquire second scan data predicted to be acquired by the robot at a second time point after the first time point;
identifying a possibility of collision with the object based on location information of the object included in the second scan data;
acquiring driving data based on the identified possibility of collision; and
controlling the driver based on the acquired driving data,
wherein the method further comprises performing preprocessing on the first scan data, and
wherein the performing preprocessing comprises:
grouping vectors adjacent to each other among a plurality of vectors included in the first scan data in units of a predetermined number;
obtaining an average value of distance values included in each of the grouped vectors; and
replacing the distance values included in each of the grouped vectors with the obtained average value to perform preprocessing on the first scan data.

14. The method of claim 13, wherein the first scan data and the second scan data are vector type data including a plurality of angles with respect to a central point of the robot and distance information corresponding to each of the plurality of angles.

15. The method of claim 13, wherein the acquiring the first scan data comprises:
acquiring a depth image of an area around the robot using a depth sensor;
acquiring three-dimensional (3D) point clouds based on camera calibration information with respect to the depth image; and
identifying points corresponding to a predetermined height among the point clouds to acquire the first scan data based on the identified points.

16. The method of claim 13, wherein the identifying the possibility of collision with the object comprises, based on a vector including a distance value smaller than a predetermined value being identified among a plurality of vectors included in the second scan data, identifying that the possibility of collision with the object at a location corresponding to the identified vector at the second time point is higher than a predetermined possibility.

17. The method of claim 16, wherein the acquiring the driving data comprises acquiring driving data for bypassing the location corresponding to the identified vector.

18. The method of claim 13,
wherein the acquiring the second scan data comprises:
inputting the preprocessed first scan data into the neural network model to acquire the second scan data.

19. The method of claim 13, wherein the acquiring the second scan data comprises:
inputting a plurality of first scan data into the neural network model to acquire the second scan data,
wherein the plurality of first scan data include first-first scan data corresponding to a first-first time point, first-second scan data corresponding to a first-second time point after the first-first time point, and first-third scan data corresponding to a first-third time point after the first-second time point.

20. The method of claim 13, further comprising:
acquiring angular velocity information of the robot based on a sensing value of a motion detection sensor, and
inputting the first scan data and the acquired angular velocity information into the neural network model to acquire the second scan data.

* * * * *

UNITED STATES PATENT AND TRADEMARK OFFICE
CERTIFICATE OF CORRECTION

PATENT NO. : 12,181,884 B2
APPLICATION NO. : 17/747611
DATED : December 31, 2024
INVENTOR(S) : Aron Baik et al.

Page 1 of 1

It is certified that error appears in the above-identified patent and that said Letters Patent is hereby corrected as shown below:

On the Title Page

Item (63), please correct the Related U.S. Application Data as follows:
(63) Continuation of application No. PCT/KR2021/016872, filed on Nov. 17, 2021.

Signed and Sealed this
Eleventh Day of February, 2025

Coke Morgan Stewart
*Acting Director of the United States Patent and Trademark Office*